United States Patent [19]

Winkler

[11] 3,747,818

[45] July 24, 1973

[54] SYSTEM FOR SCANNING THE LOOP-WARNING BARRIERS OF PNEUMATIC BUFFER CHAMBERS IN MAGNETIC TAPE UNITS

[75] Inventor: Klaus Winkler, Planegg, Germany

[73] Assignee: Siemens Aktiengesellschaft, Berlin and Munich, Germany

[22] Filed: Sept. 22, 1971

[21] Appl. No.: 182,745

[30] Foreign Application Priority Data

Sept. 22, 1970 Germany .................. P 20 46 716.7

[52] U.S. Cl. ........................ 226/1, 226/45, 242/185

[51] Int. Cl. ........................................ G11b 15/58

[58] Field of Search ............................ 226/45, 1, 2; 242/182, 185

[56] References Cited

UNITED STATES PATENTS

| | | | |
|---|---|---|---|
| 3,112,473 | 11/1963 | Wicklund | 242/185 X |
| 3,307,795 | 3/1967 | Pendleton | 242/185 |
| 3,664,604 | 5/1972 | Aweida | 242/185 |

*Primary Examiner*—Richard A. Schacher
*Attorney*—Carlton Hill, Lewis T. Steadman et al.

[57] ABSTRACT

A differential pressure switch is provided in scanning relation to the loop-warning gates or barriers in each pneumatic dashpot or buffer chamber through which the magnetic tape is looped in the operation of data processing magnetic tape units. In additon a subpressure monitor switch may be provided in the system.

4 Claims, 3 Drawing Figures

INVENTOR
Klaus Winkler
BY
Hill, Sherman, Meroni, Gross & Simpson
ATTYS.

SYSTEM FOR SCANNING THE LOOP-WARNING BARRIERS OF PNEUMATIC BUFFER CHAMBERS IN MAGNETIC TAPE UNITS

This invention relates to the art of manipulating magnetic tapes in units such as may be employed for data processing.

In data processing magnetic tape units, the tape may be automatically oriented operatively with the recording-reading head and the screening system by pneumatic dashpots or buffers acting on the tape running between supply and take-up reels. Drives for the tape reels are controlled by scanning or monitoring devices responsive to the degree of loading of the buffer systems. Such scanning or monitoring may be accomplished photoelectrically or pneumatically. If during the "loading" of such a magnetic tape apparatus the tape is initially inserted only by way of reversing pins and then is automatically drawn into the buffer chambers, certain difficulties may be encountered. Initially the vacuum blower or suction device is turned on and when the vacuum or subpressure drops below a minimum value, the winding control commences operation and loads the buffer chambers at so-called "slow speed." Then, at normal speed, that is, with normal tape feed, the starting mark of the tape is located on a magnetic tape. However, such an operation can be assured only if the scanning or monitoring devices clearly report the location of the tape loop inside and outside the loop-warning barriers in the buffer chambers.

During loading operation the tape loop passes different recesses such, for example, as in the cast platinums and in the loading cover in the vicinity of the reading head and the screening system. Due to the absence of air which passes via these recesses into the buffer chamber, the subpressure first drops and then rises again to its normal value. However, all of the subpressure or vacuum switches, which on account of safety standards cannot be set with their point of response as close as desired to the normal pressure, drop off, so that subsequently in a sequence determined by response pressure tolerances and flow resistance in the buffer chambers they will kick in again. As a result, it is impossible to safely determine whether or not the tape loops are below the upper and above the lower loop-warning barriers or gates.

It is, accordingly, an important object of the present invention to overcome the foregoing and other disadvantages, defects, inefficiencies, shortcomings and problems in prior systems of the kind indicated and to attain important advantages and improvements as will hereinafter become apparent.

Another object of the invention is to provide new and improved means for clearly indicating the position of the tape loop with respect to the warning gates or barriers in pneumatic buffer chambers for magnetic tape apparatus.

A further object of the invention is to provide new and improved means in magnetic tape apparatus pneumatic buffer chambers to provide error-free indication of the position or lack of position between the spaced loop-warning barriers and operating on differential pressure principle.

It is also an object of the invention to provide new and improved position indicating means of the character indicated, including an additional under-pressure-control device.

Other objects, features and advantages of the invention will be readily apparent from the following description of a preferred embodiment thereof, taken in conjunction with the accompanying drawing, although variations and modifications may be effected without departing from the spirit and scope of the novel concepts embodied in the disclosure, and in which.

Figure 1:
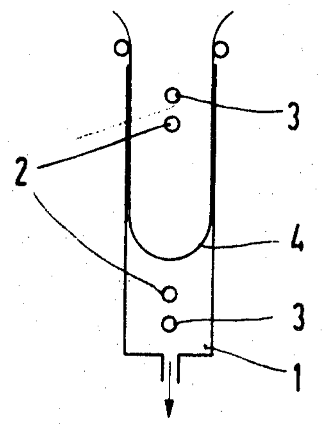
FIG. 1 is a schematic illustration of a known magnetic tape buffer chamber arrangement.

On reference to FIG. 1, a pneumatic buffer chamber 1, which to the extent shown is known according to the prior art, includes longitudinally spaced operating gates or barriers 2 for controlling the drives for tape reels. Adjacent to the distal sides of the barriers 2, considered longitudinally of the chamber, are respective loop-warning gates or barriers 3. The position of a tape loop 4 is so adjusted with the aid of the operating barriers 2 under normal operation that the tape loop 4 is always located between the tape loop-warning barriers 3 under the influence of air aspirated in the direction of the flow arrow, referring to vacuum line 1a. In case of defective, excessive or under loading of the tape the warning barriers 3 function to brake and/or disconnect the apparatus.

Figure 2:
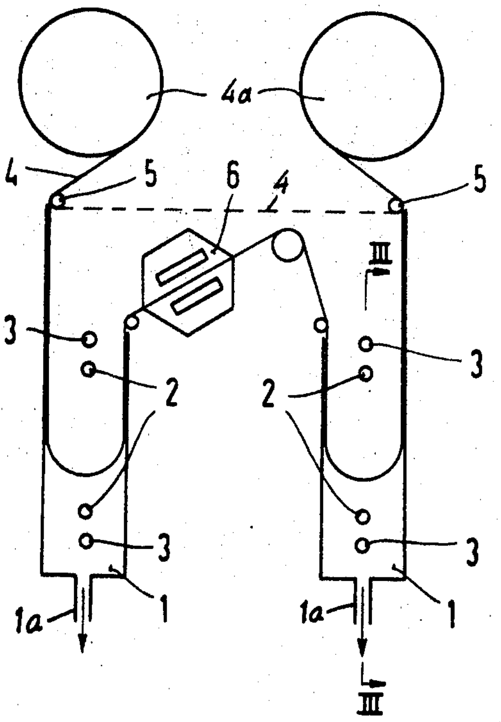
FIG. 2 is a schematic representation of a magnetic tape apparatus employing pneumatic buffer chambers.

On reference to FIG. 2, the schematic representation of a magnetic tape apparatus includes a pair of laterally spaced coextensive pneumatic buffer chambers 1 having in line with their respective outer sides respective tape-insertion or receiving guide pins or posts 5 about and between which a loop of the magnetic tape 4 extending from and between reels 4*a* is initially threaded as shown by dashed lines. One of the reels 4*a* is a supply reel and the other is a take-up reel. Upon turning on the subpressure or vacuum blower or pump (not shown) a vacuum is created in the area between the tape 4 extending between the posts 5 and the interior of the chambers 1, shown in FIG. 2 as below the tape loop, which pulls the tape into the pneumatic buffer chambers 1. This pneumatic action is indicated by the directional arrows. As the magnetic tape 4 is thus drawn toward the buffer chambers, it passes recesses, such as for example recess 6 in the area of the recording-reading head and the screening system. Due to air ingressing and passing via such recesses into the buffer chambers 1, the subpressure or vacuum first drops. Due to such drop of the vacuum, the vacuum switches (not shown) connected to the operating barriers 2 and the loop-warning barriers 3 also drop off. After passing the recess 6, and after the tape 4 enters the pneumatic buffer chambers 1, the vacuum again rises and the vacuum switches turn on in a sequence determined by the response pressure tolerances of the switches and the flow resistance in the buffer chambers. However, according to prior arrangements, it has been impossible to determine where the tape loops are at any given moment.

Figure 3:
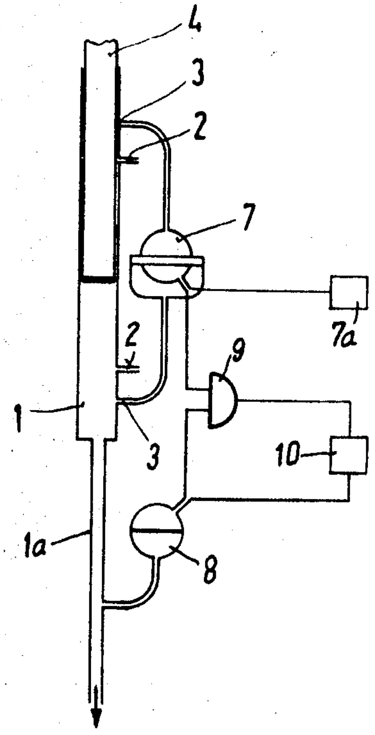
FIG. 3 is a schematic illustration of one of the buffer chambers and associated apparatus taken substantially along the line III—III of FIG. 2.

According to the present invention each of the buffer chambers 1 is provided with means whereby independently of the degree of vacuum present in the buffer chambers, an indication of the position of the tape loop inside or outside of the warning barriers 3 is clearly attained. To this end, a pressure differential switch 7 (FIG. 3) is provided for each of the buffer chambers 1 and operatively connected to the respective pair of warning gates or barriers 3 which, as shown, comprise ports spaced longitudinally in communication with the respective chamber 1 and communicating with the pressure switch by way of suitable ducts. The differential pressure switch 7 in each instance may be of a preferred known type having a movable membrane within the switch housing which closes an electrical contact in one mode, such as when at rest to close a circuit to signal output means 7*a*, such as may include any suitable indicator in the absence of pressure differential and which opens the contact when a pressure differential is effected across the switch. Thus, the differential pressure switch 7 will remain at rest when the respective tape loop in the associated chamber 1 is outside of either of the warning barriers 3, that is above the upper warning barrier 3 or below the lower warning barrier 3 and in either of which conditions the pressure is equalized on both sides of the membrane in the switch. However, when the loop is between the barriers 3, differential pressure established in the switch 7 causes it to operate and advise through its associated signalling device that the vacuum chamber 1 and its associated indrawn loop portion of the tape are functioning properly. Thereby, the operating condition of the differential pressure switch 7 is a clear, error-free indication of the position of the tape loop between the warning barriers. This arrangement offers numerous advantages among which may be mentioned the advantage of indicating independently of the vacuum prevailing at any time in the buffer chamber the position of the tape loop. Another advantage is that in each buffer chamber both of the warning barriers are monitored with one switch only in an economical and efficient manner.

Additional control may be provided by means of a vacuum monitor switch 8 which will indicate or monitor the position of the tape loop in the associated chamber 1 outside of the loop warning gates or barriers 3, and more particularly when the tape loop passes below the lowermost of the warning gates or barriers 3 so that there is a vacuumless condition in the area above the tape loop and between the two warning gates 3. The linkage of the electric output signal of the underpressure-control switch 8 with the output signal of the differential pressure switch 7 may be effected by a simple logic AND circuit 9, the output signal of which then serves for advising of the position of the tape loop outside of the loop-warning barriers. It will be understood, of course, that the monitoring switch 8 may also function where, for any reason, the tape does not loop into the chamber 1 so that a vacuum condition does not develop in the chamber by the tape loop being drawn into the close confines of the chamber and between the warning gate barriers 3. In other words, the switch 8 gives a signal resulting from its distinguishing from the vacuumless condition of the apparatus. Information from the switch 8 may be transmitted to signal output means 10 connected in the circuit 9.

It will be understood that variations and modifications may be effected without departing from the spirit and scope of the novel concepts of this invention.

I claim as my invention:

1. In a magnetic tape apparatus having at least one pneumatic buffer chamber into which a loop of tape between reels is adapted to be drawn by differential pneumatic pressure resulting from suction applied at an inner end of the buffer chamber through a vacuum line, and including a pair of loop-warning barriers spaced longitudinally of the chamber, the improvement comprising:

a differential pressure switch operatively connected to and between the loop-warning barriers;

said switch remaining in an at-rest condition when the tape loop is outside both of the loop-warning barriers and being activated by a pressure differential when the tape loop moves into position between the warning barriers to advise of such position of the loop; and a monitoring switch communicating with the vacuum line leading from said chamber and operative to monitor and signal position of the tape loop outside of the loop-warning barriers, said monitoring switch being electrically connected with said differential pressure switch.

2. A combination according to claim 1, including a logic AND circuit for providing output signal in an electrical linkage between the two switches.

3. In a system for scanning the loop-warning barriers of a pneumatic buffer chamber in a magnetic tape unit wherein a loop of magnetic tape between take-up and supply reels is first threaded over and between guide posts in a position ahead of a recording-reading head and screening system and is then pneumatically shifted into operating position by means including at least one pneumatic buffer chamber connected to a vacuum line, the improvement comprising:

scanning the position of the tape loop relative to the interior of the buffer chamber through a pressure differential switch communicating with the buffer chamber at spaced loop-warning barrier points respectively located adjacent to its opposite ends and responsive to pressure differential effected within the chamber when the tape loop enters between the spaced communication points;

monitoring the position of the tape loop outside of said spaced points;

effecting said monitoring through a pressure switch communicating with said vacuum line; and linking electrical output signal of the monitoring switch with the output signal of the pressure differential switch.

4. A system according to claim 3, including signalling the output signal through a logic AND circuit when the tape loop is outside of the loop-warning barriers.

* * * * *